United States Patent Office 3,133,871
Patented May 19, 1964

3,133,871
PREPARATION OF TETRAFLUOROETHYLENE
William Rufus Von Tress, Lake Jackson, Tex., assignor to The Dow Chemical Company, Midland, Mich., a corporation of Delaware
No Drawing. Filed Jan. 11, 1963, Ser. No. 250,745
8 Claims. (Cl. 204—169)

This invention pertains to a process for the preparation of unsaturated fluorocarbons. More particularly, it pertains to a process for the preparation of tetrafluoroethylene and other unsaturated fluorocarbons by subjecting a saturated fluorocarbon to the action of an abnormal glow discharge in the presence of carbon electrodes.

This application is a continuation-in-part of application Serial No. 72,592, filed November 30, 1960, now abandoned.

It is known that saturated fluorocarbons will react with carbon at temperatures in the range of 1700° to 4000° C. to produce unsaturated fluorocarbons. The carbon arc has been suggested as a means of heating the fluorocarbon to this temperature. However, when a carbon arc is used, the conversion, for example, of carbon tetrafluoride to tetrafluoroethylene is relatively low. Further the high temperature is a disadvantage.

It is therefore an object of this invention to provide a process for the preparation of fluoro-olefins from saturated fluorocarbons employing carbon electrodes and lower temperatures. A further object is to provide a process for the preparation of the olefins from the saturated fluorocarbons whereby an improved yield is obtained. A still further object is to provide a process for the preparation of unsaturated fluorocarbons by subjecting the fluorocarbon to the action of a particular electrical discharge.

The above and other objects are attained according to this invention, by passing, at a pressure in the range of 2 to 50 millimeters of mercury absolute, a saturated fluorocarbon having up to 2 carbon atoms between 2 carbon electrodes operating under sufficient voltage and limited electrode current density to subject the fluorocarbons to the action of the resulting abnormal glow discharge and reaction with the anode electrode to convert the saturated fluorocarbon to tetrafluoroethylene and other unsaturated fluorocarbons, and separating the unsaturated fluorocarbon from the resulting product. By subjecting the saturated fluorocarbons to the action of an abnormal glow discharge using carbon electrodes decomposition of the saturated fluorocarbons and the formation of tetrafluoroethylene and other unsaturated fluorocarbons by reaction with the carbon anode are obtained at temperatures in the range of 750° to 1250° C. In subjecting carbon tetrafluoride, for example, to the action of an abnormal glow discharge in the presence of carbon electrode at these relatively low temperatures, approximately 58 percent, for example, of the carbon tetrafluoride can be converted to tetrafluoroethylene per pass. This conversion is considerably greater than the 25 to 30 percent that can be normally expected when carbon tetrafluoride is converted to tetrafluoroethylene by subjecting the gas to the action of a carbon arc or high temperature. Operability of the instant novel process is assured by use of carbon electrodes which are consumed during the operation thereby acting as a source of carbon and actually taking part in the reaction. In the absence of a carbon anode or other source of additional carbon, $CF_4$ will not convert to $C_2F_4$ at the reaction conditions of this process.

In electrical conduction and discharge through gases, a number of distinct stages or methods are encountered. Since all gases under reduced pressure contain a certain number of ions because of cosmic rays or other electromagnetic radiation present, a limited flow of current may be obtained through a gas even though the gas is substantially non-ionized. This flow of current will be relatively independent of the voltage used. However, as the voltage is increased a point is reached often referred to as the "breakdown voltage" where the electrical potential is sufficient to ionize the gas. Thus beyond the breakdown voltage the current is passed through the gas by the ionization of the gas. This is referred to as "glow discharge." It gets its name from the soft luminous effect of the gas during this discharge. In glow discharge, a wide variation in electrode current density may be obtained without appreciable change in voltage. The voltage is nearly constant with current variation and it is necessary to limit or control the current desired by other external means.

If the current density in the glow discharge exceeds a certain maximum value for a particular gas, the characteristic of the discharge changes rapidly. An increase in voltage is necessary to increase the current. This new state is called the "abnormal glow discharge." Any attempt to obtain a further increase in current during the abnormal glow discharge suddenly results in the glow discharge changing to an arc. In addition to a total difference in the physical appearance and the method of electrical discharge between the glow discharge and arc discharge, the glow discharge is a low-current high-voltage discharge, while an arc is a high-current, low-voltage discharge.

It is surprising and unexpected to find that a saturated fluorocarbon, such as carbon tetrafluoride, hexafluoroethane, and mixtures thereof which are known to be generally stable compounds, decompose at pressures of 2 to 50 millimeters of mercury absolute, preferably 30 to 40 millimeters of mercury, to form unsaturated fluorocarbons at temperatures of 750 to 1250° C. when subjected to the action of the abnormal glow discharge therein produced in the presence of carbon electrodes. The contact time necessary to effect the conversion of the saturated fluorocarbons to an unsaturated fluorocarbon is a matter of a fraction of a second. The most convenient way to subject the fluorocarbon to the action of an abnormal glow discharge is to pass the gas through and between two tubular carbon electrodes which are operating under the proper conditions of voltage and electrode current density to obtain abnormal glow discharge within the fluorocarbon. For example in using tubular carbon electrodes having an inside diameter of approximately ⅜ inch the fluorocarbon in the form of vapor or gas may be passed through the space between the electrodes at a rate of from 100 to 1200 ml. per minute measured at standard conditions. At this rate the contact time of the fluorocarbon is from about 0.001 to 0.10 second.

While any voltage or current density at which abnormal glow discharge is obtained may be used to obtain the decomposition, an improved yield of the unsaturated fluorocarbons is obtained when the voltage is above 400 volts preferably in the range of 600 to 900 volts. Voltages as high as 1200 volts may be used but no appreciable benefit is gained. The spacing of the electrodes is such that generally the electrode current density is about 0.05 to 1 ampere per square centimeter. At a current density in the range of 0.08 to 0.2 ampere per centimeter square, an optimum yield is obtained. To obtain the above conditions of current density at the desired voltage, the spacing between the electrodes is usually in the range of ½ to 1½ inches on small electrodes and somewhat greater for larger diameter electrodes. Generally the spacing is of from 1 to 5 times the diameter of the electrodes. However, closer spacings can be satisfactorily employed. Once the abnormal glow discharge is effected the fluorocarbon gas can be continually passed between the electrodes at the above conditions without the conduction through the gas changing to other forms. Higher electrical efficiency is obtained when the electrodes are operated with a small spacing. However, when the distance is too small, for example ¼" or less, it is some what difficult to maintain the abnormal glow discharge. There is a tendency for the conduction through the gas to convert to an arc which results in an immediate temperature rise. At abnormal glow discharge, a temperature in the range of 750° to 1250° C. is obtained.

The following examples will serve further to illustrate the present invention but are not meant to limit it thereto.

*Example 1*

A reactor was constructed using copper holders for tubular carbon electrodes. The cylindrical copper electrode holders were water cooled. The gas being charged to the reactor was passed through one of the copper holders, one of the tubular carbon electrodes, between the gap between the two electrodes and then out of the reactor through the second electrode. A sight glass was provided for the reactor so that the type of electrical discharge obtained between the electrodes could be noted. Two different sized electrodes were used. One of the carbon electrodes used had a ⅜ inch outside diameter and an inside diameter of ⅛ inch. The larger sized electrodes had a ⅞ inch outside diameter and had a passageway through the center of ⅜ inch.

The pertinent details, and the results obtained are given in the table below:

| Run No. | Electrode Outside Diameter, Inch | Active Electrode Area, cm.² | Current Density, Amp./cm.² | Spacing of Electrodes, Inch | Volts | Temperature of Gas Between Electrodes, °C. | Rate of CF₄ Charged, ml./Min. at Standard Conditions | Percent Conversion of CF₄ to C₂F₄ Per Pass |
|---|---|---|---|---|---|---|---|---|
| 1 | ⅞ | 25 | 0.08 | 3½ | 960 | 1,125 | 368 | 52 |
| 2 | ⅜ | 15 | 0.09 | ⅝ | 540 | 1,000 | 188 | 52 |
| 3 | ⅜ | 15 | 0.10 | 1 | 580 | 1,000 | 65 | 56 |
| 4 | ⅞ | 30 | 0.120 | 3½ | 925 | 1,200 | 472 | 50 |

The temperature of the gas as it flowed between the electrodes was determined by means of an optical pyrometer.

When copper electrodes were substituted for the carbon anode and cathode, there was substantially no conversion of $CF_4$.

Similar results are obtained when hexafluoroethane is used in place of carbon tetrafluoride.

*Example 2*

In a second test made in an apparatus and under reaction conditions similar to that described in Example 1, a material balance was run for the reactants charged and products produced by reacting $CF_4$ in the glow discharge apparatus.

For this run, $CF_4$ was charged at a flow rate of about 65 cc./minute for 25 minutes through a tubular carbon electrode having about a ⅜ inch outside diameter and an internal through passage having a diameter of about ⅛ inch. The current density was about 1 ampere/cm.², electrode spacing (distance apart) about 0.02 inch and the voltage about 600 volts.

The percent conversion of $CF_4$ reactant was about 60%. About 600 cc. of the product mixture was collected in a cold trap and about 850 cc. in a receiver attached to the trap. Analysis of the product mixture in the two vessels showed the following composition.

| | Total Volume Product (cc.) | Volume Percent | | | | |
|---|---|---|---|---|---|---|
| | | CF₄ | C₂F₆ | C₂F₄ | CO₂ | SiF₄ |
| Cold Trap | 600 | 30 | 4.2 | 61 | 4.2 | 0.5 |
| Receiver | 850 | 50 | 3.0 | 31 | 8.5 | 0.2 |

Substantially pure $CF_4$ was used as a feed gas. This material has a C/F atom ratio of about 0.25. The product mixture, including unreacted $CF_4$ reactant, has a C/F atom ratio of about 0.39. This increase in carbon is attributed to carbon supplied by the anode during the reaction.

*Example 3*

A further run was made in an apparatus and under reaction conditions similar to that described in Example 1. As in Example 2, a material balance was made for the reactants charged and products produced by reacting $CF_4$ in the glow discharge apparatus.

For this run, $CF_4$ was charged at a flow rate of about 188 cc./minute for 10 minutes through a tubular carbon electrode having about a ⅜ inch outside diameter and an internal through passage having a diameter of about ⅛ inch.

The current density was about 1 ampere/cm.², electrode spacing (distance apart) about ⅝ inch and the voltage about 750 volts. The percent conversion of $CF_4$ reactant was about 40%. About 580 cc. of product mixture was collected in a cold trap and about 1000 cc. in a receiver attached to the trap. Vapor phase chromatographic analysis of the product mixture in the two vessels indicated the following composition.

| | Total Volume of Product (cc.) | Volume Percent | | |
|---|---|---|---|---|
| | | CF₄ | C₂F₆ | C₂F₄ |
| Cold Trap | 580 | 62.5 | 5.2 | 32.2 |
| Receiver | 1,000 | 73.1 | 3.2 | 24.6 |

As in Example 2, substantially pure $CF_4$ was used as a feed gas. This material has a C/F atom ratio of about 0.25. The product mixture, including unreacted $CF_4$ reactant, has a C/F atom ratio of about 0.32. The calculated weight of carbon fed into the reactor was 0.92 gram. The calculated weight of carbon in the product was 1.02 grams. Again, the increase in carbon is attributed to carbon supplied by the anode during the reaction.

Various modifications can be made in the present invention without departing from the spirit or scope thereof for it is understood that I limit myself only as defined in the appended claims.

I claim:

1. A process for the preparation of an unsaturated fluorocarbon, which comprises passing, at a pressure in the range of 2 to 50 millimeters of mercury absolute, a saturated perfluorocarbon having up to 2 carbon atoms between two carbon electrodes operating at a voltage and anode current density to thereby obtain abnormal glow discharge through the saturated perfluorocarbon to convert said saturated perfluorocarbon to unsaturated fluorocarbon, and separating the unsaturated fluorocarbon from the resulting product.

2. A process for the preparation of the unsaturated fluorocarbons, which comprises passing, at a pressure in the range of 2 to 50 millimeters of mercury absolute, a saturated perfluorocarbon having up to 2 carbon atoms between two carbon electrodes operating at a voltage of 400 to 1200 volts, a current density in the range of 0.05 to 1 ampere per square centimeter, and at a temperature in the range of 750° to 1250° C. to thereby obtain an abnormal glow discharge through said saturated perfluorocarbon between the two carbon electrodes to convert the saturated fluorocarbon to unsaturated fluorocarbons, and separating the unsaturated fluorocarbons from the resulting product.

3. A process according to claim 2 wherein the perfluorocarbon is carbon tetrafluoride.

4. A process according to claim 3 wherein the perfluorocarbon is hexafluoroethane.

5. A process for the preparation of the tetrafluoroethylene, which comprises passing between two carbon electrodes, at a pressure in the range of 30 to 40 millimeters of mercury absolute, carbon tetrafluoride at a voltage of 600 to 900 volts, a current density in the range of 0.05 to 1 ampere per square centimeter, and at a temperature in the range of 750° to 1250° C. to thereby obtain an abnormal glow discharge through the carbon tetrafluoride between the two carbon electrodes to convert the carbon tetrafluoride to tetrafluoroethylene, and separating the tetrafluoroethylene from the resulting product.

6. A process according to claim 5 wherein the electrode current density is in the range of 0.08 to 0.2 ampere per centimeter squared.

7. A process for the preparation of the tetrafluoroethylene, which comprises passing, at a pressure in the range of 30 to 40 millimeters of mercury absolute, hexafluoroethane between two carbon electrodes operating at a voltage of 600 to 900 volts, a current density in the range of 0.05 to 1 ampere per square centimeter, and at a temperature in the range of 750° to 1250° C. to thereby obtain an abnormal glow discharge through said fluorocarbon between the two carbon electrodes to convert the fluorocarbon to tetrafluoroethylene, and separating the tetrafluoroethylene from the resulting product.

8. A process according to claim 7 wherein the electrode current density is in the range of 0.08 to 0.2 ampere per square centimeter.

References Cited in the file of this patent

UNITED STATES PATENTS 2,709,192 Farlow _____ May 24, 1955